(12) United States Patent
Jones et al.

(10) Patent No.: US 8,336,941 B1
(45) Date of Patent: Dec. 25, 2012

(54) ARRANGEMENT FOR HOUSING A DEVICE IN AN INTERIOR OF A VEHICLE

(75) Inventors: Thomas A. Jones, Macomb, MI (US); Timothy Saunders, Warren, MI (US); Raymond A. Beaufait, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/172,526

(22) Filed: Jun. 29, 2011

(51) Int. Cl.
*B60R 7/04* (2006.01)
(52) U.S. Cl. ...................................... 296/37.8
(58) Field of Classification Search .................. 296/37.8, 296/24.3, 24.34, 24.43, 153, 1.09
See application file for complete search history.

(56) References Cited

U.S. PATENT DOCUMENTS

| | | | |
|---|---|---|---|
| 5,678,875 A * | 10/1997 | Zipperle et al. | 296/37.8 |
| 5,996,866 A * | 12/1999 | Susko et al. | 224/281 |
| 6,945,582 B2 * | 9/2005 | Chen | 296/37.8 |
| 7,007,996 B2 * | 3/2006 | Lee et al. | 296/37.8 |
| 7,159,916 B2 * | 1/2007 | Stack et al. | 296/24.34 |
| 8,052,192 B2 * | 11/2011 | Groeller et al. | 296/37.8 |
| 2005/0018392 A1 * | 1/2005 | Strohmeier et al. | 361/683 |
| 2008/0048467 A1 * | 2/2008 | Vorberg | 296/37.8 |
| 2010/0156129 A1 * | 6/2010 | Evans et al. | 296/24.34 |
| 2010/0244505 A1 * | 9/2010 | Demick et al. | 297/188.04 |
| 2012/0119536 A1 * | 5/2012 | Quijano | 296/37.8 |

FOREIGN PATENT DOCUMENTS

JP 06179338 A * 6/1994

* cited by examiner

*Primary Examiner* — H Gutman
(74) *Attorney, Agent, or Firm* — Ingrassia Fisher & Lorenz, P.C.

(57) ABSTRACT

An arrangement for housing a device in an interior of a vehicle is disclosed herein. The arrangement includes, but is not limited to, a trim component that is configured to be mounted within a passenger compartment of a vehicle. The trim component defines a cavity. The cavity is configured to substantially conform to the device, to engage with multiple surfaces of the device, and to support the device in a generally horizontal orientation. The trim component further defines an opening to the cavity. The arrangement further includes a retaining body that is connected to the trim component. The retaining body is configured to inhibit egress of the device from the cavity through the opening when the device is positioned within the cavity.

20 Claims, 6 Drawing Sheets

ARRANGEMENT FOR HOUSING A DEVICE IN AN INTERIOR OF A VEHICLE

TECHNICAL FIELD

The technical field generally relates to vehicles, and more particularly relates to an arrangement for housing a device in an interior of a vehicle.

BACKGROUND

Consumers are increasingly using and/or accessing laptop computers, tablet computers, electronic readers, and other types of portable computers (referred to collectively herein as a "computing device" or as "computing devices") while they are sitting inside the passenger compartments of their vehicles. To facilitate their use of such computing devices, many consumers will extract their computing devices from their respective carrying cases and position them on an adjacent vehicle seat, a center console, an armrest or some other horizontal surface within the passenger compartment of the vehicle. This provides the consumer with ready access to the computing device.

While placement of a computing device on a horizontal surface within the interior of the vehicle may provide the consumer with accessibility, there are some potential problems associated with this solution. For example, a computing device resting on a horizontal surface such as a center console, an armrest, and a vehicle seat is unrestrained. The absence of any restraint may lead to undesired movement of the computing device within the passenger compartment under the urging of dynamic forces experienced during vehicle maneuvers. Additionally, a computing device left on a horizontal surface in the passenger compartment of a vehicle may be plainly visible from outside of the vehicle. Such visibility from the exterior of the vehicle may entice a thief to break and enter into the vehicle to steal the computing device.

Accordingly, it is desirable to provide an arrangement that is effective to secure a device such as, but not limited to, a computing device against undesired movement during vehicle maneuvers. In addition, it is desirable to provide an arrangement that conceals the device during periods when the vehicle is parked or is otherwise left unattended. Furthermore, other desirable features and characteristics will become apparent from the subsequent detailed description and the appended claims, taken in conjunction with the accompanying drawings and the foregoing technical field and background.

SUMMARY

Various embodiments of an arrangement for housing a device in an interior of a vehicle are disclosed herein.

In a first non-limiting embodiment, the arrangement includes, but is not limited to, a trim component configured to be mounted within a passenger compartment of a vehicle. The trim component defines a cavity. The cavity is configured to substantially conform to the device, to engage with multiple surfaces of the device, and to support the device in a generally horizontal orientation. The trim component further defines an opening to the cavity. The arrangement further includes a retaining body that is connected to the trim component. The retaining body is configured to inhibit egress of the device from the cavity through the opening when the device is positioned within the cavity.

In another non-limiting embodiment, the arrangement includes, but is not limited to, a trim component that is selected from the group consisting of a center console and an armrest. The trim component is configured to be mounted within a passenger compartment of a vehicle. The trim component defines a cavity. The cavity is configured to substantially conform to the device, to engage with multiple surfaces of the device, and to support the device in a generally horizontal orientation. The trim component further defines an opening to the cavity. The arrangement further includes a retaining body that is connected to the trim component. The retaining body is configured to inhibit egress of the device from the cavity through the opening when the device is positioned within the cavity.

In another non-limiting embodiment, the arrangement includes, but is not limited to, a trim component that is selected from the group consisting of a center console and an armrest. The trim component is configured to be mounted within a passenger compartment of a vehicle. The trim component defines a cavity. The cavity is configured to substantially conform to the device, to engage with multiple surfaces of the device, and to support the device in a generally horizontal orientation. The trim component further defines an opening to the cavity. The arrangement further includes a retaining strap that is connected to the trim component. The retaining strap is configured to engage the trim component and the device to inhibit egress of the device from the cavity through the opening when the device is positioned within the cavity. The arrangement further includes a retaining wall that is disposed proximate the opening. The retaining wall is configured to inhibit egress of the device from the cavity through the opening when the device is positioned within the cavity. The arrangement still further includes a close out that is disposed proximate the opening. The close out is configured to conceal the opening.

DESCRIPTION OF THE DRAWINGS

One or more embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An arrangement for housing a device such as, but not limited to, a computing device, in an interior of the vehicle is disclosed herein. The solution entails utilizing an existing trim component of the vehicle's interior, such as a center console, an armrest, an instrument panel, a seat cushion, and the like to house the device. The trim component includes a cavity that is configured to receive the device and an opening that provides access to the cavity from the interior of the vehicle. The cavity has a configuration that generally conforms to the shape of the device and is further configured to support the device in a generally horizontal orientation. In this manner, a driver or occupant of the vehicle may insert his or her device into the cavity of the trim component for storage during vehicle operations and also for concealment during periods when the vehicle will be left unattended.

The arrangement also includes a structure that is configured to retain the device within the cavity once the device has been placed there. In some examples, the structure may include a retaining wall that extends in a generally upward direction from a floor surface of the cavity. The retaining wall would serve to obstruct movement of the device through the opening and thus would inhibit unintended egress of the device from the cavity. In other embodiments, the structure may be a strap that is configured to be releasably attached to the trim component and to obstruct movement of the device through the opening when the strap is attached to the trim component.

A further understanding of the above described arrangement for housing a device such as, but not limited to, a computer device in an interior of a vehicle may be obtained through a review of the illustrations accompanying this application together with a review of the detailed description that follows.

Figure 1:
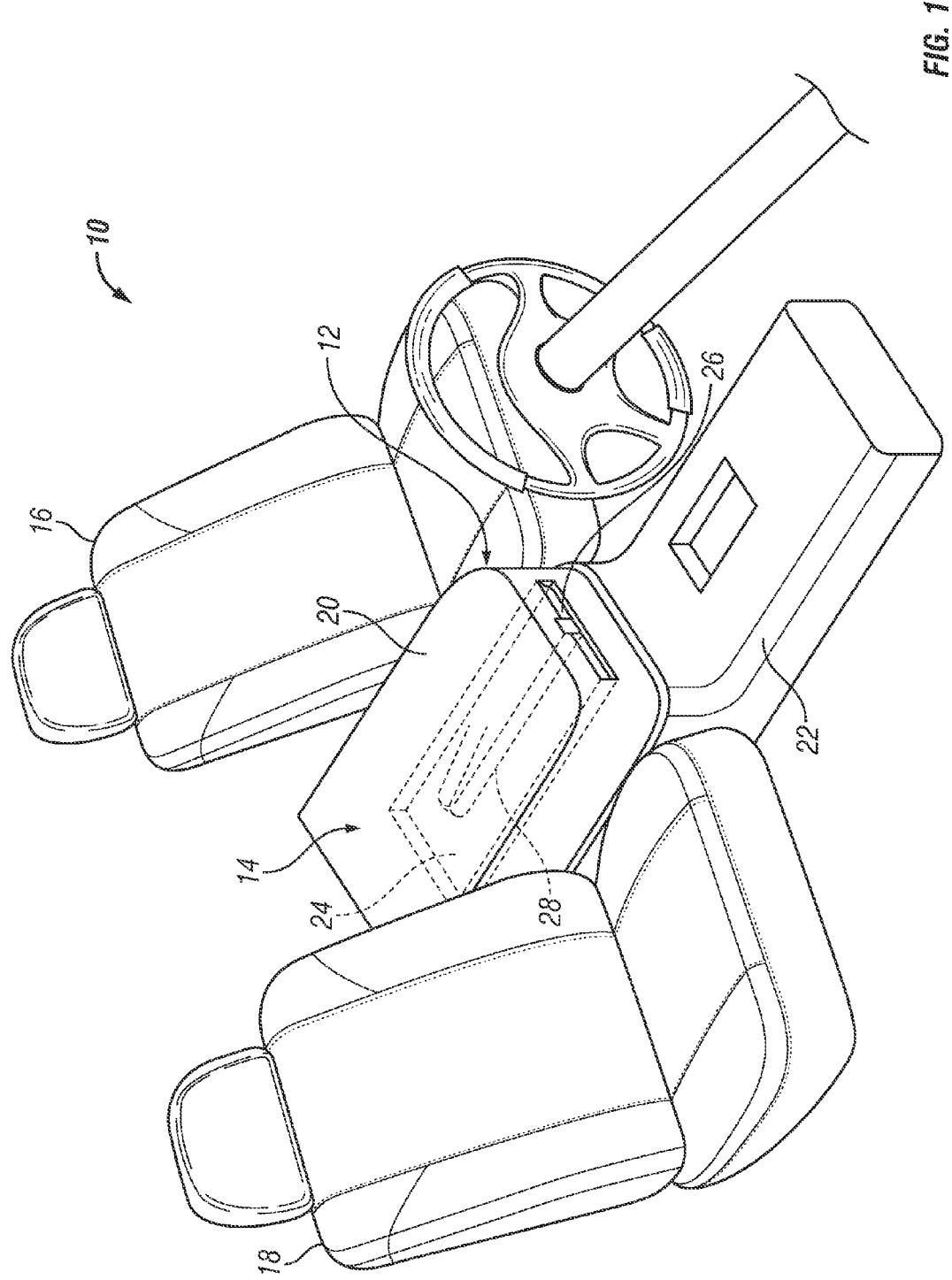
FIG. 1 is a perspective environmental view illustrating an arrangement for housing a device in an interior of the vehicle made in accordance with the teachings of the present disclosure.

FIG. 1 is a perspective environmental view illustrating an interior 10 of a vehicle having a bucket seat arrangement in a front portion of the passenger compartment. Interior 10 includes an arrangement 12 for housing a device. In the embodiment illustrated in FIG. 1, arrangement 12 has been incorporated into a center console 14 that is positioned between a driver seat 16 and a front passenger seat 18. Although arrangement 12 has been illustrated as being incorporated into a center console that is positioned between the front bucket seats of an automobile, it should be understood that arrangement 12 may be incorporated into any suitable interior trim component of an automobile. It should further be understood that arrangement 12 may be positioned at any seating position within an automobile and is not limited to usage in the front portion of the vehicle's passenger compartment. It should be further understood that arrangement 12 is not limited to usage with automobiles, but rather may be used in any type of vehicle including, but not limited to, aircraft, watercraft, trains, and spacecraft.

Arrangement 12 is incorporated into an armrest portion 20 of center console 14. Arrangement 12 includes a cavity 24 that has been defined in armrest portion 20. Cavity 24 has a configuration that generally conforms to a device and that extends within armrest portion 20 in a manner that permits cavity 24 to support the device in a generally horizontal orientation. In some embodiments, cavity 24 forms a chamber having a generally rectangular cross-section. In other embodiments, other geometric cross sections are possible. In some embodiments, cavity 24 is configured such that the device fits snugly between an upper and lower surface to inhibit undesired movement of the device as the vehicle maneuvers.

Arrangement 12 also includes an opening 26 to provide a driver or passenger with access to cavity 24. In the illustrated embodiment, opening 26 is defined in a front surface of armrest portion 20. In other embodiments, opening 26 may be defined in side surfaces or a rear surface of armrest portion 20 without departing from the teachings of the present disclosure.

Arrangement 12 further includes a retaining strap 28. Retaining strap 28 is configured to be releasably attached to armrest portion 20 in close proximity to opening 26. When retaining strap 28 is attached to armrest portion 20, retaining strap 28 serves to secure a device inside of cavity 24 by obstructing opening 26.

Figure 2:
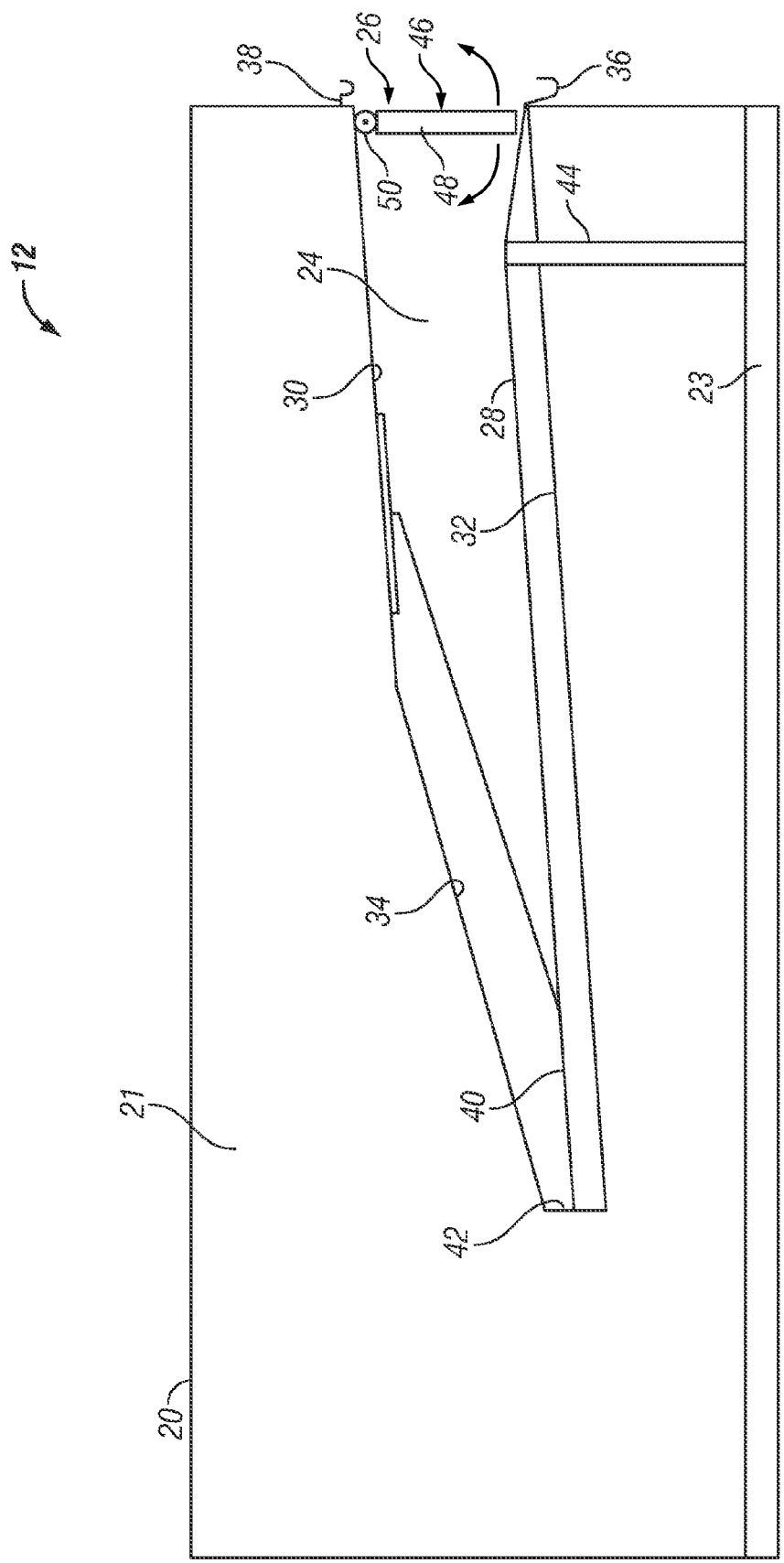
FIG. 2 is a schematic side view illustrating the embodiment of the arrangement illustrated in FIG. 1 prior to insertion of a device.

FIG. 2 is a schematic side view illustrating arrangement 12 prior to insertion of a device into cavity 24. Armrest portion 20 may be constructed, in part, of a compressible foam material. Cavity 24 may be formed in the foam material of armrest portion 20 during an injection molding process that is used to fabricate armrest portion 20. Cavity 24 may be formed by placing an appropriately configured insert into the mold prior to introduction of the foam material into the mold in a manner that is well known in the art. In such an arrangement, the walls forming the cavity would be compressible.

In the embodiment illustrated in FIG. 2, armrest portion 20 is constructed, in part, of a foam material such that armrest portion 20 includes a foam portion 21 mounted on a substrate 23. Foam portion 21 is compressible. Cavity 24 has been defined in foam portion 21. Substrate 23 may be made of any suitable material including plastic and metal and is not substantially compressible.

Cavity 24 is defined, in part, by an upper surface 30 and a lower surface 32. Upper surface 30 and lower surface 32 are configured to support a device in a generally horizontal orientation. Upper surface 30 includes a tapered portion 34 that is configured to engage the device as the device is inserted into cavity 24. Furthermore, owing to the fact that cavity 24 has been defined in foam portion 21 of armrest portion 20, tapered portion 34 may be compressed to deform in a manner that conforms to the contours of any device that is inserted into cavity 24. Such compression allows cavity 24 to snugly engage the device, to retain the device within cavity 24, and to inhibit the device from movement during vehicle maneuvers.

In the embodiment illustrated in FIG. 2, lower surface 32 has a slight downward grade in a direction towards the rear of cavity 24. This downward grade takes advantage of gravitational forces to assist in retaining a device within cavity 24.

Retaining strap 28 includes a hook 36 that is configured to engage a hook engaging member 38 positioned above opening 26. When hook 36 is engaged with hook engaging member 38 while a device is positioned within cavity 24, retaining strap 28 will obstruct opening 26 and will thereby inhibit egress of the device from cavity 24. An elastic strap 40 is connected at one end to a rear surface 42 of cavity 24 and at an opposite end to retaining strap 28. Elastic strap 40 is configured to bias retaining strap 28 in a direction towards an interior of cavity 24 and thereby takes up any slack in retaining strap 28 and retains hook 36 in a position that is proximate opening 26.

A retaining wall 44 is connected to substrate 23 and extends in an upward direction into cavity 24. Retaining wall 44 extends only a portion of the way between lower surface 32 and upper surface 30. In this manner, a device may be maneuvered over and past an upper portion of retaining wall 44 when being inserted into cavity 24. When an end of the device is pushed past retaining wall 44, it will fall onto lower surface 32 and will be inhibited from movement towards opening 26 through engagement with retaining wall 44.

A close out 46 is positioned in opening 26 and is configured to close opening 26. Close out 46 includes a door 48 and a hinge 50. Hinge 50 allows door 48 to swing towards and away from a rear portion of cavity 24 in a manner similar to a hinged door covering a mail slot. Door 48 extends in a vertical direction and a lateral direction to conceal opening 26. Door 48 enhances the aesthetically pleasing appearance of armrest portion 20 by concealing cavity 24. Door 48 also serves to conceal the presence of a device positioned inside of cavity 24.

In some embodiments, lower surface 32 and/or upper surface 30 may be covered by carpeting or other material to create an aesthetically pleasing fit and finish and also to obtain a desired coefficient of static and kinetic friction which can further assist in retaining a device within cavity 24. In still other embodiments, material or other trim pieces may be positioned over an external portion of door 48 for the purposes of creating a more aesthetically pleasing appearance.

Figure 3:
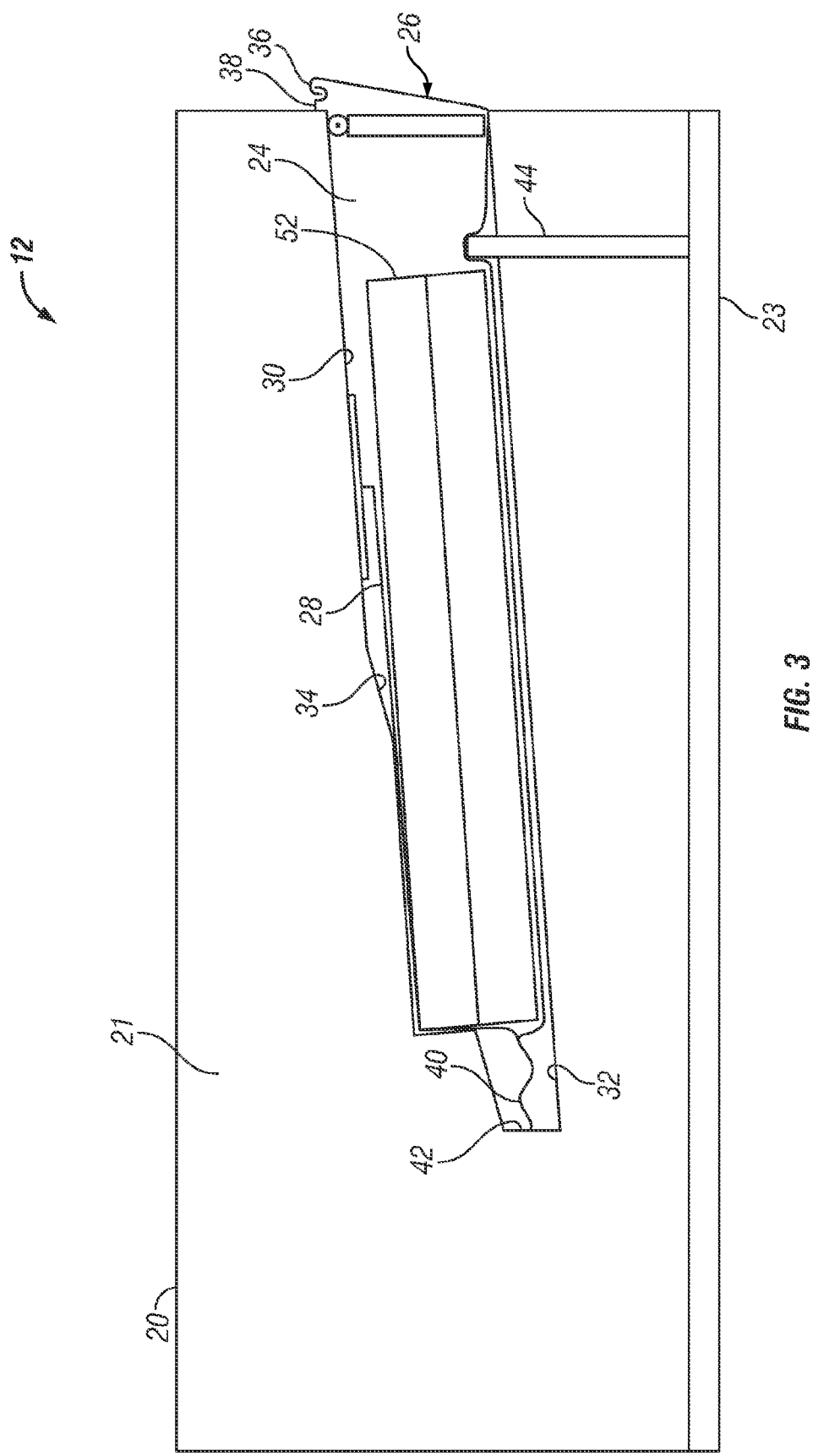
FIG. 3 is a schematic side view similar to FIG. 2 illustrating the arrangement after insertion of a device.

FIG. 3 is a schematic side view similar to FIG. 2 illustrating arrangement 12 with a device 52 positioned in cavity 24. Retaining strap 28 has been secured to armrest portion 20 through engagement between hook 36 and hook engaging member 38. This engagement causes retaining strap 28 to obstruct opening 26 and to thereby inhibit device 52 from exiting through opening 26 during braking or other vehicle maneuvers. As illustrated, retaining strap 28 also wraps around a rear portion of device 52 and extends under a bottom portion of device 52. This arrangement will be advantageous when it is time to remove device 52 from cavity 24.

Retaining wall 44 is positioned forward of device 52 and extends upwardly into cavity 24 above a bottom portion of device 52. Consequently, any movement of device 52 towards opening 26 as a result of braking or other vehicle maneuvers will be obstructed by retaining wall 44.

Tapered portion 34 of upper surface 30 has been deformed around an upper surface of a rear portion of device 52. This deformation compresses device 52 between upper surface 30 and lower surface 32 to snugly retained device 52 to within cavity 24.

In other embodiments, arrangement 12 may omit one or more of the retaining features illustrated in FIG. 3 without departing from the teachings of the present disclosure. For example, alternate embodiments of arrangement 12 may include only one of retaining strap 28 and retaining wall 44. In still other embodiments, different impediments and structures and/or additional impediments and structures may be included with arrangement 12 to prevent the unintended egress of device 52 from cavity 24 without departing from the teachings of the present disclosure.

Figure 4:
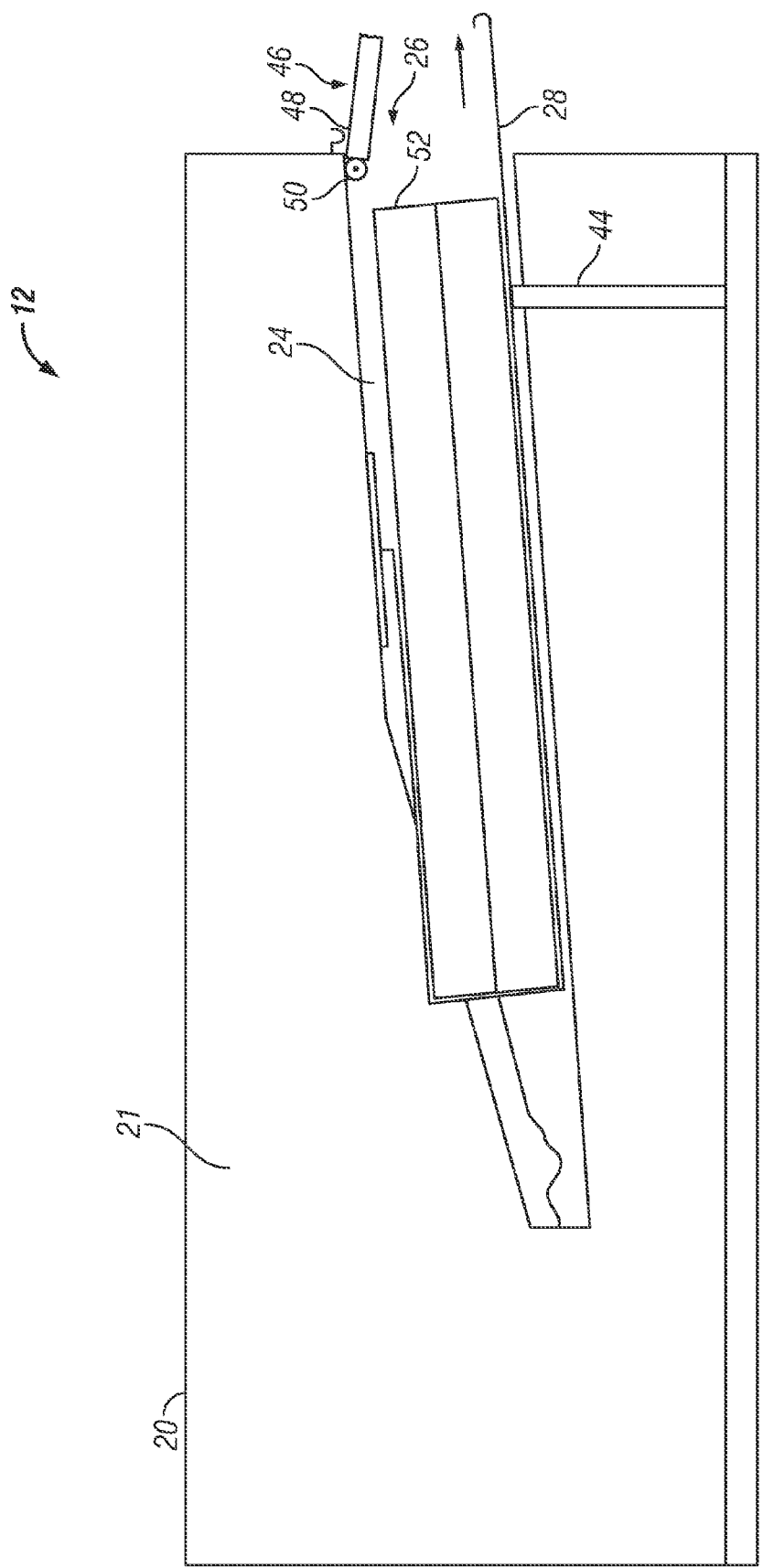
FIG. 4 is a schematic side view similar to FIG. 3 illustrating removal of the device from the arrangement.

FIG. 4 is a schematic side view similar to FIG. 3 illustrating removal of device 52 from cavity 24. A person wishing to remove device 52 from cavity 24 may pull open door 48 and then pull in an outward direction on retaining strap 28. By pulling on retaining strap 28, a forward portion of device 52 may be lifted up and over an upper portion of retaining wall 44 while a rear portion of device 52 will be urged by retaining strap 28 towards opening 26. When device 52 has been pulled such that a portion of device 52 extends outside of cavity 24, a person may grasp device 52 with his or her hands to complete the removal of device 52 from cavity 24.

Figure 5:
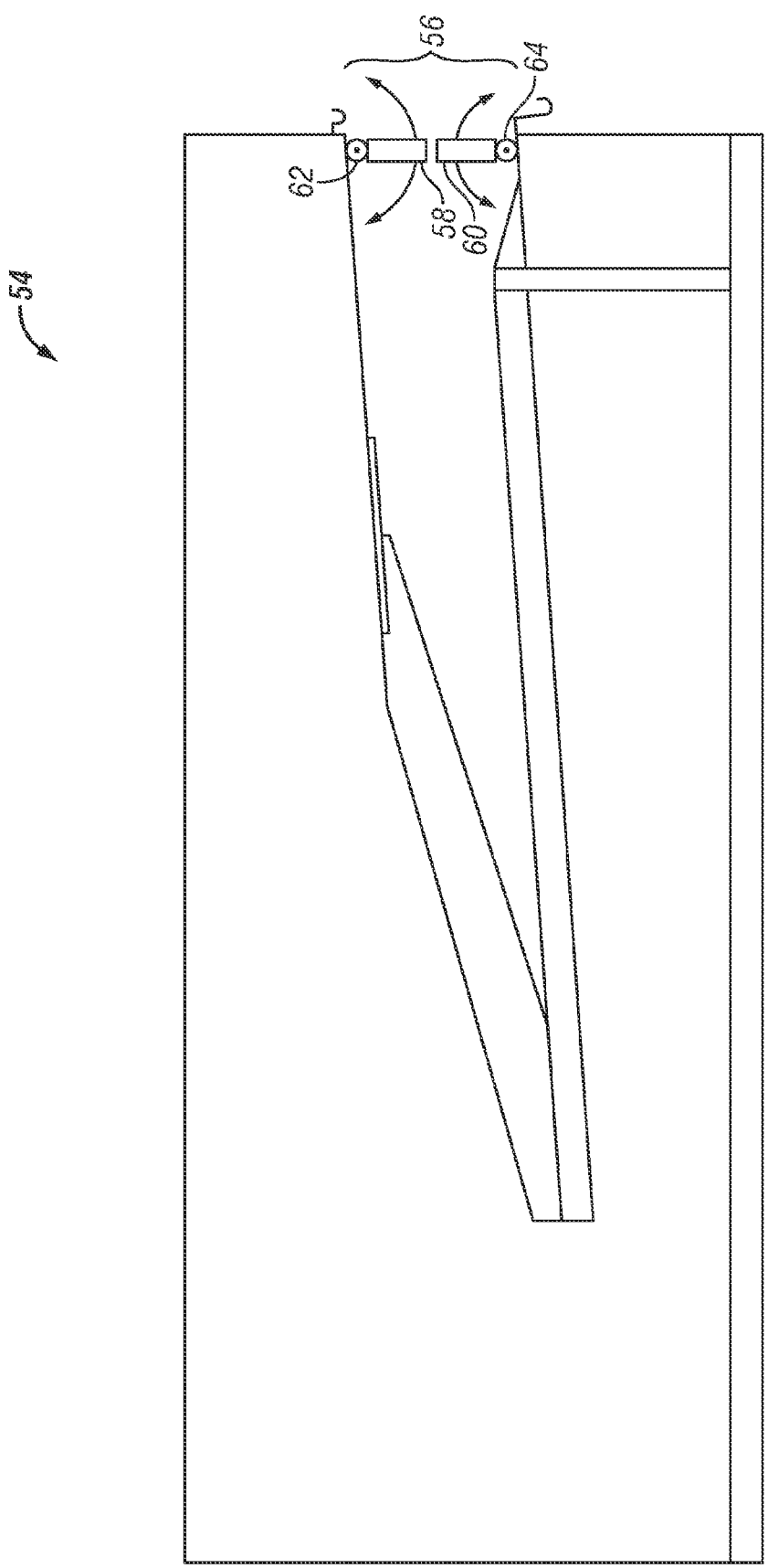
FIG. 5 is a schematic side view similar to FIG. 2 illustrating another embodiment of an arrangement for housing a device in an interior of a vehicle.

FIG. 5 is a schematic side view similar to FIG. 2 illustrating another embodiment 54 of an arrangement for housing a device in an interior of a vehicle. With continuing reference to FIG. 2, embodiment 54 differs from arrangement 12 in substantially only one respect. Whereas arrangement 12 included closeout 46 having a single door 48 and a single hinge 50, embodiment 44 includes a closeout 56 including two doors, a door 58 and a door 60 and two hinges, a hinge 62 and a hinge 64 arranged in a saloon door configuration. Some customers may find closeout 56 to be more aesthetically pleasing.

Figure 6:
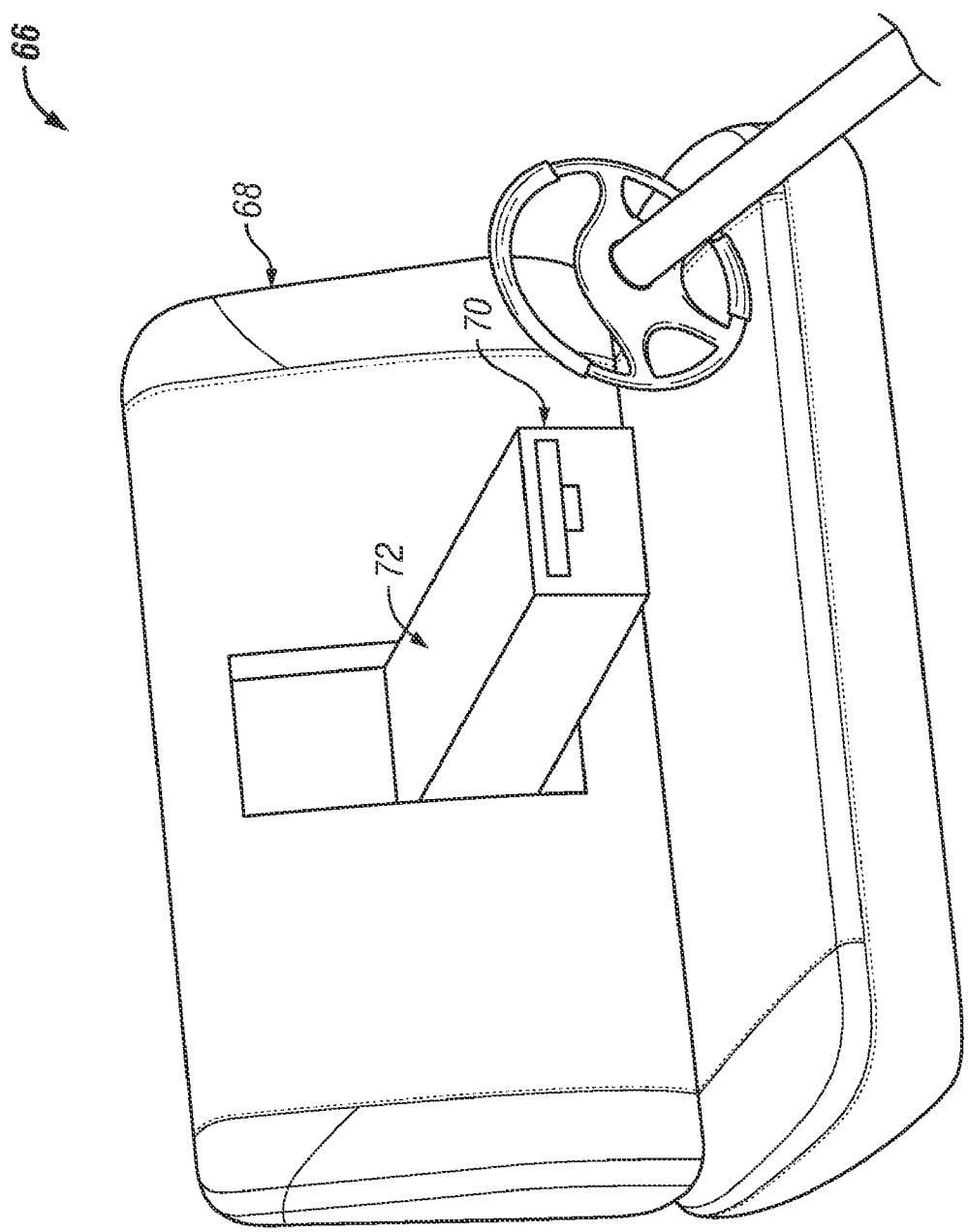
FIG. 6 is a perspective environmental view illustrating another embodiment of an arrangement for housing a device in an interior of the vehicle.

FIG. 6 is a perspective environmental view illustrating an interior 66 of a vehicle having a bench seat arrangement in the front portion of the passenger compartment. Interior 66 includes an arrangement 70 for housing a device incorporated into a retractable armrest 72. With continuing reference to FIGS. 1-5, arrangement 70 is substantially identical to arrangement 12 with the primary exception being the trim component into which it has been incorporated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An arrangement for housing a device in an interior of a vehicle, the arrangement comprising:
   a trim component configured to be mounted within a passenger compartment of the vehicle, the trim component defining a cavity, the cavity being configured to substantially conform to the device, to engage with multiple surfaces of the device, and to support the device in a generally horizontal orientation, the trim component further defining an opening to the cavity; and
   a retaining body connected to the trim component, the retaining body configured to inhibit egress of the device from the cavity through the opening when the device is positioned within the cavity.

2. The arrangement of claim 1, wherein the retaining body comprises a retaining strap.

3. The arrangement of claim 2, wherein the retaining strap is attached to an upper surface of the cavity and is configured to wrap around a rear portion and an under side of the device when the device is positioned within the cavity, and further configured to be releasably connected to the trim component proximate the opening.

4. The arrangement of claim 2 further comprising a biasing member connecting a portion of the retaining strap to the cavity, the biasing member configured to bias the retaining strap towards a retracted position.

5. The arrangement of claim 4, wherein the biasing member comprises an elastic strap.

6. The arrangement of claim 1, wherein the retaining body comprises a retaining wall positioned proximate the opening, the retaining wall partially obstructing the opening.

7. The arrangement of claim 6, wherein the retaining wall extends in a substantially upward direction from a lower surface of the cavity.

8. The arrangement of claim 1, wherein a wall defining the cavity includes a tapered portion and wherein the tapered portion is configured to engage the device when the device is positioned within the cavity.

9. The arrangement of claim 1, wherein a floor of the cavity has a grade such that a first portion of the floor disposed proximate the opening has a higher elevation than a second portion of the floor disposed remotely from the opening.

10. The arrangement of claim 1, further comprising a closeout disposed proximate the opening, the close out configured to conceal the opening.

11. The arrangement of claim 10, wherein the closeout comprises a door that is configured to swing towards and away from the cavity to permit insertion and removal of the device.

12. The arrangement of claim 10, wherein the closeout comprises a first door and a second door, the first door and the second door disposed opposite one another, the first door and the second door each configured to swing towards and away from the cavity to permit insertion and removal of the device.

13. The arrangement of claim 1, wherein the opening faces in a forward direction of the vehicle.

14. The arrangement of claim 1, wherein the trim component comprises a foam portion and wherein the cavity is defined in the foam portion.

15. An arrangement for housing a device in an interior of a vehicle, the arrangement comprising:
   a center console configured to be mounted within a passenger compartment of the vehicle, the center console defining a cavity, the cavity being configured to substantially conform to the device, to engage with multiple surfaces of the device, and to support the device in a generally horizontal orientation, the center console further defining an opening to the cavity; and
   a retaining body connected to the center console, the retaining body configured to inhibit egress of the device from the cavity through the opening when the device is positioned within the cavity.

16. The arrangement of claim 15, wherein the retaining body comprises a retaining strap.

17. The arrangement of claim 15, wherein the retaining body comprises a retaining wall positioned proximate the opening, the retaining wall partially obstructing the opening.

18. The arrangement of claim 15, wherein a wall defining the cavity includes a tapered portion and wherein the tapered portion is configured to engage the device when the device is positioned within the cavity.

19. The arrangement of claim 15, further comprising a close out disposed proximate the opening, the close out configured to conceal the opening.

20. An arrangement for housing a computing device in an interior of a vehicle, the arrangement comprising:
   a center console configured to be mounted within a passenger compartment of the vehicle, the center console defining a cavity, the cavity being configured to substantially conform to the computing device, to engage with multiple surfaces of the computing device, and to support the computing device in a generally horizontal orientation, the center console further defining an opening to the cavity;
   a retaining strap connected to the center console, the retaining strap configured to engage the trim component and the computing device to inhibit egress of the computing device from the cavity through the opening when the computing device is positioned within the cavity;
   a retaining wall disposed proximate the opening, the retaining wall configured to inhibit egress of the computing device from the cavity through the opening when the computing device is positioned within the cavity; and
   a close out disposed proximate the opening, the close out configured to conceal the opening.

* * * * *